United States Patent [19]

Davidson

[11] 4,017,756
[45] Apr. 12, 1977

[54] AUTOMATIC SENSOR POSITIONER
[75] Inventor: Hugh McDermand Davidson, Warren, Mich.
[73] Assignee: Borg-Warner Corporation, Chicago, Ill.
[22] Filed: Aug. 18, 1975
[21] Appl. No.: 605,701
[52] U.S. Cl. .............................................. 310/168
[51] Int. Cl.² ...................................... H02K 17/42
[58] Field of Search .......... 310/168, 152, 169, 155, 310/170, 70 A, 75, 75 C; 336/135; 322/47

[56] References Cited
UNITED STATES PATENTS

| | | | |
|---|---|---|---|
| 3,530,323 | 9/1970 | Applequist | 310/168 |
| 3,626,227 | 12/1971 | Ritsema | 310/168 |
| 3,769,534 | 10/1973 | Wroblewski | 310/168 |
| 3,772,548 | 6/1972 | Wroblewski | 310/168 |
| 3,890,517 | 6/1975 | Marsh | 310/168 |
| 3,937,994 | 2/1976 | Presley | 310/168 |
| 3,942,045 | 3/1976 | Palazzetti | 310/155 |

Primary Examiner—R. Skudy
Attorney, Agent, or Firm—James A. Geppert

[57] ABSTRACT

An automatic speed sensor positioner for use on a wheel of an automotive vehicle where a speed sensor device is located in the brake drum of each wheel of an automotive vehicle and cooperates with a slotted rotor rotating with the wheel to sense the speed thereof. This device includes a housing mounted in the brake drum and a magnetic sensor positioned in the housing; the housing and sensor having complementary tapered surfaces which are urged together by a spring, so that the sensor will move into proper position determined by an ablative plate on the sensor when it is engaged by the rotor as the wheel is assembled on the axle.

11 Claims, 6 Drawing Figures

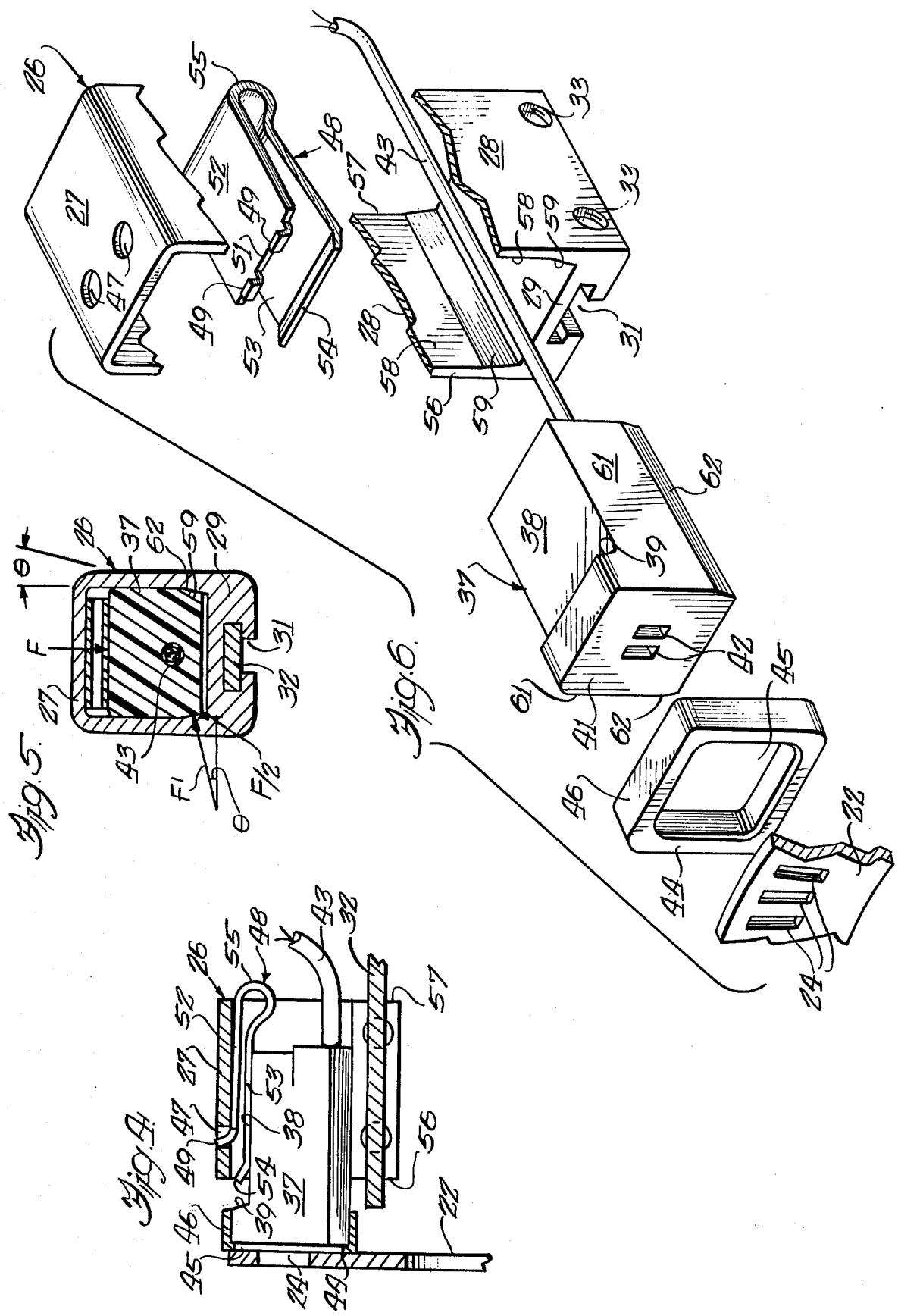

AUTOMATIC SENSOR POSITIONER

BACKGROUND AND SUMMARY OF THE INVENTION

The present invention relates to an automatic speed sensor positioner for an automotive vehicle, and more particularly to a vehicle wheel speed sensor which is automatically and positively adjusted by the assembling of the wheel on the axle.

Modern anti-skid control systems operate on the basis of electrical signals which indicate the angular velocity of one or more of the vehicle wheels. These signals are generally derived from an electromagnetic sensor, including a magnet mounted on a stationary part of the vehicle, such as the axle housing, and a slotted or notched metal ring or rotor which rotates with the wheel opposite the magnet. As the openings or discontinuities in the rotor pass the magnetic poles of the sensor, the resultant flux variations produce a signal, the frequency of which is a function of the angular velocity of the wheel.

To provide the necessary accuracy of the velocity signal for use in a brake control system, the sensor and rotor must be precisely positioned with respect to each other during assembly of the wheel on the axle and must remain in the adjusted relationship during use, even after extended operation in which the components are subjected to road shocks and constant vibration, and must be protected from dirt, mechanical damage and heat.

Among the objects of the present invention is the provision of a novel automatic sensor positioner for a vehicle wheel speed sensor in which the rotating and stationary components of the sensor mechanism are automatically adjusted to a precise relationship when the wheel is mounted on the axle and maintained in that relationship during vehicle operation.

Another object of the present invention is the provision of a novel automatic sensor positioner for a wheel speed sensor wherein the rotor is mounted on the vehicle wheel and the magnetic sensor is mounted on the stationary axle structure in a housing. The housing and magnetic sensor have cooperating tapered or inclined surfaces to frictionally retain the sensor in its adjusted position, with a spring applying a regulated force to urge the tapered surfaces into frictional engagement. The sensor can be easily repositioned in the housing through the use of a simple tool.

The present invention also comprehends a sensor mechanism including a magnetic sensor, a housing for the sensor that is mounted on a stationary portion of the vehicle, such as the axle, and an ablative plate operatively mounted on the front face of the magnetic sensor and having an opening to expose the magnet pole pieces. The ablative plate is utilized to accurately space the sensor from the rotor.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 4 is a vertical cross sectional view taken on the line 4—4 of FIG. 3.

FIG. 5 is a vertical cross sectional view taken on the line 5—5 of FIG. 2.

FIG. 6 is an exploded perspective view of the speed sensor assembly.

DESCRIPTION OF THE PREFERRED EMBODIMENT

Figure 1:
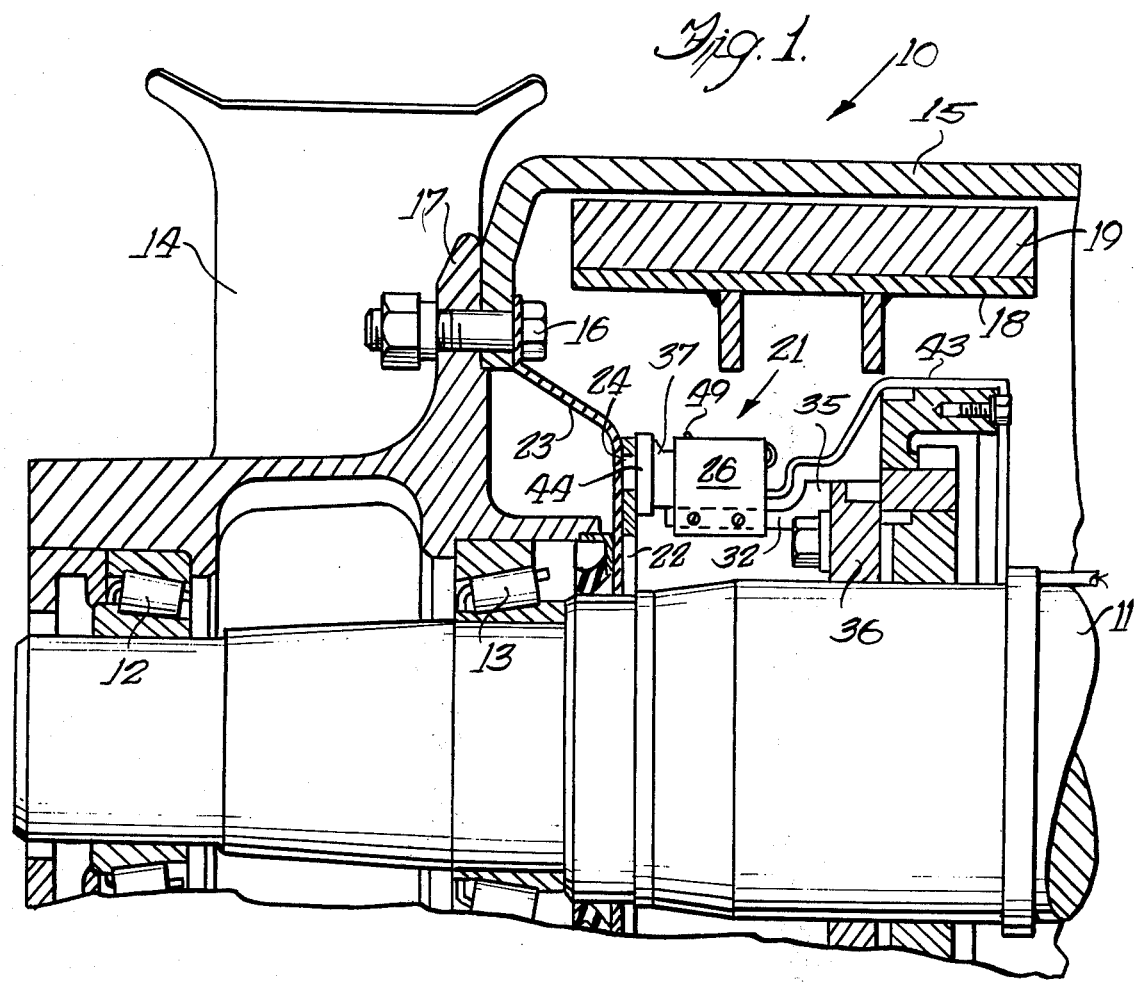
FIG. 1 is a fragmentary vertical sectional view showing a wheel sensor mechanism mounted on an axle bearing in a vehicle wheel assembly.

Referring more particularly to the disclosure in the drawings wherein is shown an illustrative embodiment of the present invention, FIG. 1 discloses a wheel assembly 10 which constitutes one wheel of an automotive vehicle wherein the vehicle axle 11 for the purposes of this invention will be considered to be a non-steerable axle, such as might be used as a trailer axle designed for heavy duty usage. The axle is provided at its outer end with spaced bearing seats for a pair of bearing assemblies 12 and 13 upon which a wheel hub 14 is rotatably supported in conventional fashion with the extremity of the axle being provided with a lockable adjusting nut (not shown) whereby the two bearings can be precisely adjusted to insure proper mounting of the wheel on the axle.

A brake drum 15 is connected by a plurality of circumferentially spaced bolts 16 to a radial flange 17 of the hub 14, and the flange 17 also carries a plurality of wheel mounting studs (not shown) for securing a vehicle wheel to the wheel hub. A conventional brake assembly cooperates with the brake drum 15 and includes brake shoes 18 having linings 19 which are suitably actuated by a mechanism (not shown) in the wheel assembly 10 to urge the brake shoes 18 outwardly to engage the friction linings 19 against the brake drum 15 upon actuation by the vehicle operator.

The wheel speed sensor assembly 21 includes a rotor or tone wheel formed by a metal ring 22 carried by a flared ring 23 which is secured in the assembly by the bolts 16 on the wheel hub flange 17. The ring 22 is provided with a plurality of equally circumferentially spaced openings or notches 24 therein; the openings being closely spaced so as to approach or exceed one hundred in number. A magnetic sensor assembly 25 includes a generally square tubular housing 26 having a top wall 27, parallel side walls 28, 28, and a bottom wall 29; a generally T-shaped slot 31 being formed in the bottom wall 29 to open downwardly and extend longitudinally for the length of the housing. An elongated mounting bracket arm 32 is received in the slot 31 and the housing 26 is adjustably secured thereto by set screws 34 in threaded openings 33 in the sides 28, 28. The bracket terminates at its rear end in a mounting flange 35 to be suitably secured to a flange section or spider 36 on the axle.

The assembly 25 also includes a magnetic sensor unit 37 which is of a generally square configuration in vertical cross section with a portion of the top surface being cut away to provide a surface 38 (FIGS. 4 and 6) which defines a slightly inclined shoulder 39 adjacent the forward end 41 of the unit. The sensor is formed of a suitable non-conductive material, such as a plastic, and has a magnetic assembly imbedded therein which includes a plurality of magnetic poles 42 and electrical components (not shown) that convert the signals generated by the magnet to a proper form for use in the brake control system for the vehicle. The leads to the power supply for the sensor unit 37 as well as for the output signal are contained in a cable 43 leading to and from the rear of the sensor unit to the control system (not shown).

An ablative plate 44 formed of a suitable non-conductive material, such as a suitable plastic, is of a thickness to generally define the requisite spacing between the rotor ring 22 and the front surface 41 of the sensor unit 37 and has an opening 45 therein aligned with and exposing the ends of the magnetic poles 42. The plate has a rearwardly extending peripheral flange 46 which frictionally engages the body of the sensor unit 37 to be retained thereon.

The top wall 27 of the housing has a pair of spaced openings 47, 47 to receive upturned tabs 49, 49 formed on the edge 51 of a generally U-shaped spring 48. The spring is provided with an upper arm 52 terminating in the edge 51 and a lower arm 53 frictionally engaging the cut-away surface 38 and terminating in an upturned lip 54; the arms being joined by a generally circular base portion 55. With the tabs 49, 49 positioned in the openings 47, 47, the spring is located in the housing, as clearly shown in FIG. 4, with the upturned lip 54 substantially aligned with the front edge 56 of the housing and the base portion 55 generally aligned with the rear edge 57 thereof. Inserting the sensor unit 37 into the housing, the lip 54 facilitates entry of the sensor unit and compression of spring arm 53 such that, with the sensor unit inserted for a predetermined amount, the spring arm 53 remains frictionally engaged with surface 38.

As clearly seen in FIGS. 5 and 6, the side walls 28, 28 of the housing 26 are provided with inner parallel surfaces 58, 58 terminating adjacent the bottom wall 29 in a pair of inwardly inclined or tapered surfaces 59, 59. Also, the sensor unit 37 has parallel side walls 61, 61 terminating at their lower edges in inwardly tapering surfaces 62, 62 generally complementary to the surfaces 59, 59 in the housing. Thus, when the sensor unit 37 is inserted into the housing, the tapered surfaces 59, 62 are in engagement, and the action of the spring 48 urges the sensor unit downward to cause a wedging action between the tapered surfaces and multiplies the frictional force holding the sensor unit in the housing.

Considering the angle of the tapered surface to be – and the force of the spring to be F, the force holding the sensor in the housing is proportional to the reciprocal of the sine of the wedge angle as follows:

$$F^1 = F/(2 \sin \theta) \text{ (See FIG. 5)}$$

The equivalent friction force = $\mu N F^1 = (\mu F)/(\sin \theta)$ where $\mu$ is the coefficient of friction for the materials of the sensor unit and housing. This allows the sensor to be held against 40g forces and yet be easily adjusted (g = force of gravity). The coefficient of friction of the plastic materials forming the sensor unit and the housing made of a metal, such as aluminum, may vary considerably. Thus, it is essential that the force to move the sensor unit once it is installed never drops below 20g. In order to do this in the small space available in a vehicle brake and still retain the feature of simple hand assemblable parts, sufficient frictional resistance against movement by forces exceeding 20g is easily provided by proper selection of wedge angle and spring force.

Figure 2:
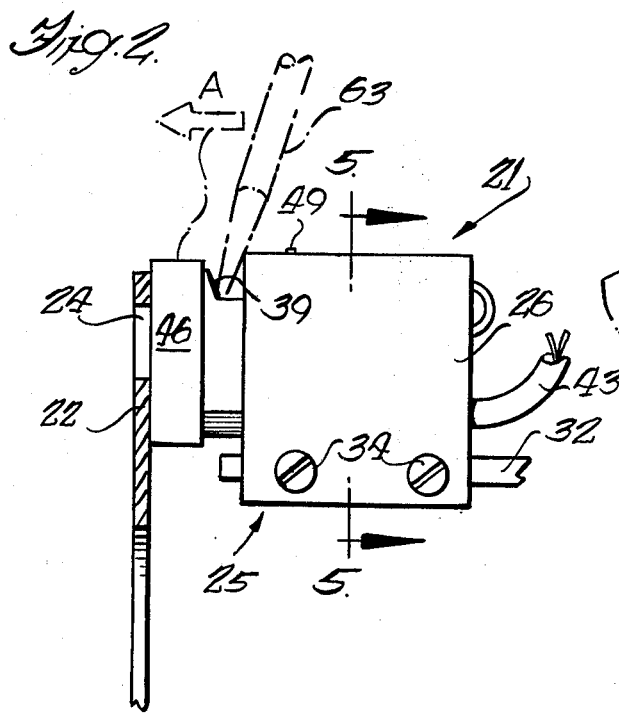
FIG. 2 is a side elevational view of the sensor and rotor and showing the mode of adjustment of the sensor by a screwdriver or similar tool.
Figure 3:
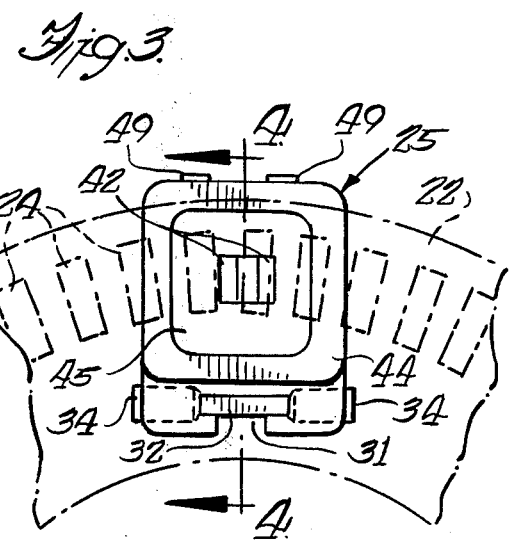
FIG. 3 is a front elevational view of the wheel speed sensor.

The spring 48 is preferably formed of stainless steel rated at 400° F operation continuously. Although this spring in combination with the wedge angle provides a frictional force of at least 20g, the sensor unit can be moved into position in the housing upon assembly of the wheel onto the axle, and the sensor unit can be adjusted relative to the housing by the use of a simple tool, such as a screwdriver 63. As seen in FIG. 2, the blade of a screwdriver 63 can be inserted between the shoulder 39 and the front edge 56 of the housing and oscillated against the housing so that the lower end of the blade urges the sensor unit 37 to the left in the direction of the arrow A.

To assemble, the rotor plate or ring 22 is mounted on the flared ring 23 secured to a vehicle wheel hub flange 17. The housing 26 is secured on the bracket are 32 by screws 34, which in turn is suitably secured to the axle assembly on a spider or flange section 36. The sensor unit 37 is partially inserted into the housing 26 and the ablative plate 44 is mounted on the front of the sensor unit. Obviously, the spring 48 is positioned in the housing to engage the upper surface 38 of the partially inserted sensor unit. The cable 43 extends out the rear end of the housing and is routed to appropriate connections for the sensor. When the wheel hub is mounted on the axle and secured by adjustment and locking of the bearing adjustment nut, the rotor ring 22 engages the ablative plate 44 and pushes the sensor unit 37 into the housing 26 to its final adjusted position where it is frictionally retained by the wedging effect of the tapered surfaces 59, 62 and the spring 48.

The entire assembly once the housing has been positioned inside the brake in entirely blind; however, by removing the hub and tone wheel assembly, the sensor unit may be reset by the use of a screwdriver as detailed above. The ablative plate 44 provides a means for accurately spacing the end 41 of the sensor unit or pickup from the tone or rotor ring 22 which causes the electrical signal to be generated as the apertured rotor ring moves past the sensor unit. The function of the ablative plate is to provide sufficient space to take up for bearing wear and variation once the sensor has been assembled, and initial wear of the ablative plate occurs without disturbing the running clearance between the rotor and sensor unit. An important advantage of this assembly resides in the housing 26 which may be mounted in at least three ways, and an extremely long range of adjustment is available for this class of device. As an example, the adjustment may be as much as 0.75 inches with an overall housing length of 2.875 inches.

I claim:
1. A wheel speed sensor assembly for utilization with a vehicle wheel rotatably mounted on an axle, comprising a rotor operatively connected to said wheel for rotation therewith, a magnetic sensing assembly including a housing, a sensor unit operatively positioned in said housing and having magnetic poles exposed at the forward end of the sensor unit facing the rotor, means on the sensor unit adapted to provide a predetermined spacing between the rotor and sensor unit, said housing and sensor unit having frictionally engageable surfaces, a generally U-shaped spring having one arm engaging the housing and the other arm engaging the sensor unit to bias the friction surfaces together, the top surface of the sensor unit is cut away to provide a shoulder adjacent the forward end of the sensor unit, said cutaway portion providing space for said spring, and mounting means operatively securing the magnetic sensing assembly on said axle.

2. A wheel speed sensor assembly as set forth in claim 1, in which said housing has parallel interior side walls terminating adjacent their lower edges in inwardly inclined surfaces, and said sensor unit has parallel side walls terminating in inwardly tapering surfaces, said inclined and tapering surfaces adapted to be frictionally engaged to retain the sensor unit in adjusted position in the housing.

3. A wheel speed sensor assembly as set forth in claim 2, in which said ablative plate has a peripheral flange encompassing the forward end of the sensor unit.

4. A wheel speed sensor assembly as set forth in claim 2, in which said rotor has a plurality of circumferentially spaced openings passing in general alignment with the opening in the ablative plate.

5. A wheel speed sensor assembly as set forth in claim 1, in which said housing has a pair of spaced openings in the top wall thereof, said one arm of the spring terminating in a pair of upturned ears received in said openings, and said other spring arm terminating in an upturned lip generally aligned with the front end of the housing.

6. A wheel speed sensor assembly as set forth in claim 1, in which said sensor unit is repositioned forwardly in said housing by engagement of said shoulder and the front end of the housing with a tool to force these surfaces apart.

7. A wheel speed sensor assembly as set forth in Claim 2, in which said spring engages and urges the sensor unit downward in said housing causing said tapered and inclined surfaces to be wedged together to enhance the frictional retaining forces.

8. A wheel speed sensor assembly for utilization with a vehicle wheel rotatably mounted on an axle, comprising a rotor operatively connected to said wheel for rotation therewith, a magnetic sensing assembly including a housing, a sensor unit operatively positioned in said housing and having magnetic poles exposed at the forward end of the sensor unit facing the rotor, means on the sensor unit adapted to provide a predetermined spacing between the rotor and sensor unit, said housing having parallel interior side walls terminating adjacent their lower edges in inwardly inclined surfaces, said sensor unit having parallel side walls terminating in inwardly tapering surfaces, a generally U-shaped spring having one arm engaging the housing and the other arm engaging the sensor unit to bias the sensor unit downwardly and cause frictional engagement of said inclined and tapered surfaces to retain the sensor unit in adjusted position in the housing, and mounting operatively securing the magnetic sensing assembly on said axle.

9. A wheel speed sensor assembly as set forth in claim 1, in which said spacing means comprises an ablative plate mounted on the forward end of said sensor unit and having a central opening exposing said magnetic poles.

10. A wheel speed sensor assembly for utilization with a vehicle wheel rotatably mounted on an axle, comprising a rotor ring operatively connected to the wheel for rotation therewith, a magnetic sensing assembly, and mounting means operatively securing the magnetic sensing assembly on said axle, said magnetic sensing assembly including a housing open at both ends and having a passage extending therethrough, said housing comprising a top wall having a pair of spaced openings therein, a pair of side walls with parallel interior surfaces terminating adjacent their lower edges in a pair of inwardly inclined surfaces, and a bottom wall, a sensor unit operatively positioned in said housing and having magnetic poles exposed at the forward end thereof facing said rotor ring, said sensor unit having a top surface which is cut away to define a shoulder adjacent the forward end and parallel side walls terminating adjacent their lower edges in inwardly tapering surfaces, a generally U-shaped spring positioned in the housing in the space defined by the cut-away top surface of the sensor unit and having a first arm engaging the top housing wall and terminating in a pair of upturned ears received in said spaced openings and a second arm engaging the upper surface of the sensor unit, said second arm terminating in an upturned lip, said spring urging the sensor unit downward in the housing to cause engagement of said tapered and inclined surfaces in a wedging action, an ablative plate abutting the forward end of the sensor unit and having a peripheral flange frictionally engaging the sensor unit to provide a predetermined spacing between the rotor ring and sensor unit, said ablative plate having a central opening exposing the magnetic poles, said rotor ring having a plurality of circumferentially equally spaced openings adapted to be aligned with said opening in the ablative plate.

11. A wheel speed sensor assembly as set forth in claim 10, in which said housing bottom wall has a longitudinally extending slot therethrough and said mounting means includes an elongated arm received in said slot, and a plurality of set screws positioned in said housing bottom wall to engage the arm and adjustably secure the arm in the slot.

* * * * *